(12) United States Patent  
Vadlamani (10) Patent No.: US 7,979,324 B2  
(45) Date of Patent: Jul. 12, 2011

(54) VIRTUAL CATALOG

(75) Inventor: Viswanath Vadlamani, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1171 days.

(21) Appl. No.: 11/711,372

(22) Filed: Feb. 27, 2007

(65) Prior Publication Data

US 2008/0208713 A1    Aug. 28, 2008

(51) Int. Cl.
G06Q 30/00 (2006.01)
G06F 7/00 (2006.01)

(52) U.S. Cl. .................. 705/27.1; 707/690; 707/691

(58) Field of Classification Search .......... 705/27, 705/27.1, 27.2; 707/690, 691
See application file for complete search history.

(56) References Cited

U.S. PATENT DOCUMENTS

| | | | |
|---|---|---|---|
| 5,982,890 A * | 11/1999 | Akatsu | 707/690 |
| 6,032,145 A * | 2/2000 | Beall et al. | 1/1 |
| 6,850,900 B1 | 2/2005 | Hare et al. | |
| 7,054,880 B2 | 5/2006 | Vishik et al. | |
| 7,133,882 B1 * | 11/2006 | Pringle et al. | 1/1 |
| 7,526,486 B2 * | 4/2009 | Cushman et al. | 1/1 |
| 7,805,348 B2 * | 9/2010 | Nanjundamoorthy et al. | 705/36 R |
| 2003/0028451 A1 * | 2/2003 | Ananian | 705/27 |
| 2003/0055812 A1 * | 3/2003 | Williams et al. | 707/1 |
| 2003/0135327 A1 * | 7/2003 | Levine et al. | 701/220 |
| 2003/0200156 A1 | 10/2003 | Roseman et al. | |
| 2003/0204449 A1 | 10/2003 | Kotas et al. | |
| 2003/0225778 A1 | 12/2003 | Fisher et al. | |
| 2004/0085338 A1 | 5/2004 | Terashima et al. | |
| 2005/0289050 A1 | 12/2005 | Narayanan et al. | |
| 2006/0224571 A1 | 10/2006 | Leon et al. | |
| 2007/0073704 A1 * | 3/2007 | Bowden et al. | 707/10 |
| 2007/0276858 A1 * | 11/2007 | Cushman et al. | 707/102 |
| 2008/0046929 A1 * | 2/2008 | Cho et al. | 725/46 |

FOREIGN PATENT DOCUMENTS

| | | |
|---|---|---|
| WO | WO-01/04775 A2 * | 1/2001 |
| WO | WO-01/77884 A1 * | 10/2001 |
| WO | WO-02/073493 A1 * | 9/2002 |
| WO | WO02073493 A1 | 9/2002 |

OTHER PUBLICATIONS

Coyle, K., et al., "Record Matching: An Expert Algorithm" (Abstract only), pp. 77-80 in "ASIS '85, Proceedings of the 48th ASIS Annual Meeting," Knowledge Ind. Publications, 1985.*

Anon., "Liaison Content Exchange 2.0 Powers Electronic Catalogs With Content That Accelerates Commerce," PR Newswire, Aug. 28, 2000.*

(Continued)

Primary Examiner — Nicholas D Rosen (74) Attorney, Agent, or Firm — Capitol City TechLaw; Richard C. Irving (57) ABSTRACT

Records, including data for a virtual catalog, may be received from a number of sources. Each of the received records may be validated and a determination may be made as to whether one or more previously-received records matches the received record. When two or more records are determined to be matching records, a composite object may be created and information from the two or more records may be included in the composite object. If the matching records include conflicting information, then previously-defined rules may be applied to determine which items of the conflicting information have precedence over other items of the conflicting information. A virtual catalog may be created from the received records and the created composite object based on customized attributes.

20 Claims, 6 Drawing Sheets

OTHER PUBLICATIONS

Nakajima et al., "A Real-Time E-Marketplace System for Advertising Opportunities on Datacasting," http://www10.org/cdrom/posters/1133/.*

Gudnason et al., "eProCon: electronic Product Information in Construction", http://itc.scix.net/datatworks/att/w78-2005-D2-3-Gundason.pdf.

Schubert, P., "The Participatory Electronic Product Catalog: Supporting Customer Collaboration in E-Commerce Applications", Date: Oct. 2000, pp. 229-236(8), vol. 10, No. 4, http://www.ingentaconnect.com/content/routledg/rema/2000/00000010/00000004/art00004.

* cited by examiner

| SOURCE | PRECEDENCE LEVEL |
|---|---|
| DP1 | 10 |
| DP2 | 20 |
| DP3 | 30 |

|  | ELEMENT 1 | ELEMENT 2 | ELEMENT 3 |
|---|---|---|---|
| DP1 | 100 | 100 | 100 |
| DP2 | 50 | 200 | 120 |
| DP3 | 150 | 300 | 60 |

FIG. 6

| ATTRIBUTES | AISLE |
|---|---|
| ATTRBUTE 1 | 1 |
| ATTRIBUTE 2 | 1 |
| ATTRIBUTE 3 | 1 |
| ATTRIBUTE 4 | 2 |
| ATTRIBUTE 5 | 2 |
| ATTRIBUTE 6 | 2 |
| ATTRIBUTE 7 | 3 |
| ATTRIBUTE 8 | 4 |
| ATTRIBUTE 9 | 4 |

FIG. 7

VIRTUAL CATALOG

BACKGROUND

In existing online marketing systems, virtual catalogs may be created, such that a shopper may purchase products from the virtual catalog while shopping online. Typically, data for the virtual catalog may be provided by multiple sources. In some cases, a single product may be described differently in different portions of the virtual catalog, depending upon respective sources of data used to produce the different portions of the virtual catalog. For example, one product may be appear in different portions of the virtual catalog with different prices, or one item may appear in different portions of the virtual catalog with descriptions having conflicting information.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In embodiments consistent with the subject matter of this disclosure, records from a number of sources or data feeds may be received and processed by a processing device. Each of the records may include information describing an aspect of an item or a product to be included in a virtual catalog. As each record is received, a check may be performed to determine whether one or more previously-received records matches the received record. In one embodiment, a previously-received record may be determined to be a match for one or more previously-received records when the records include information pertaining to a same item or product. In other embodiments, other criteria may be used to determine whether the one or more previously-received records are a match for the received record.

A composite object may be created to include information from the matching records. If the matching records include conflicting information, then previously-defined rules may be applied to determine which items of the conflicting information to include in the composite object.

After all records have been received and processed, a virtual catalog may be created from the received records and the created composite objects based on customized attributes.

DRAWINGS

In order to describe the manner in which the above-recited and other advantages and features can be obtained, a more particular description is described below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure.

Overview

In embodiments consistent with the subject matter of this disclosure, records, including data for a virtual catalog, may be received from multiple data feeds or sources. Each of the received records may include values for one or more attributes of an item or product, which may be included in a virtual catalog. When a record is received, a check may be made to determine whether one or more previously-received records is a match for the received record. In one embodiment, a previously-received record may be determined to be a match for a received record when both records include values pertaining to one or more attributes of a same item or product. In other embodiments, other criteria may be used to determine whether a previously-received record is a match for a received record.

When two or more records are determined to match, a composite object may be created and information from the two or more records may be included in the composite object. If the information from the two or more records includes conflicting information, then previously-defined business rules may be applied to the records to determine which one of the records has precedence over others of the records. The conflicting information from the record having precedence over others of the records may be included in the composite object. In some embodiments, the business rules may determine a precedence of an element of a record based on a source of the record.

A virtual catalog may be created from the received records and the created composite objects based on customized attributes specified by a merchant. In some embodiments, the customized attributes may define an organization of the virtual catalog.

Exemplary Processing Device

Figure 1:
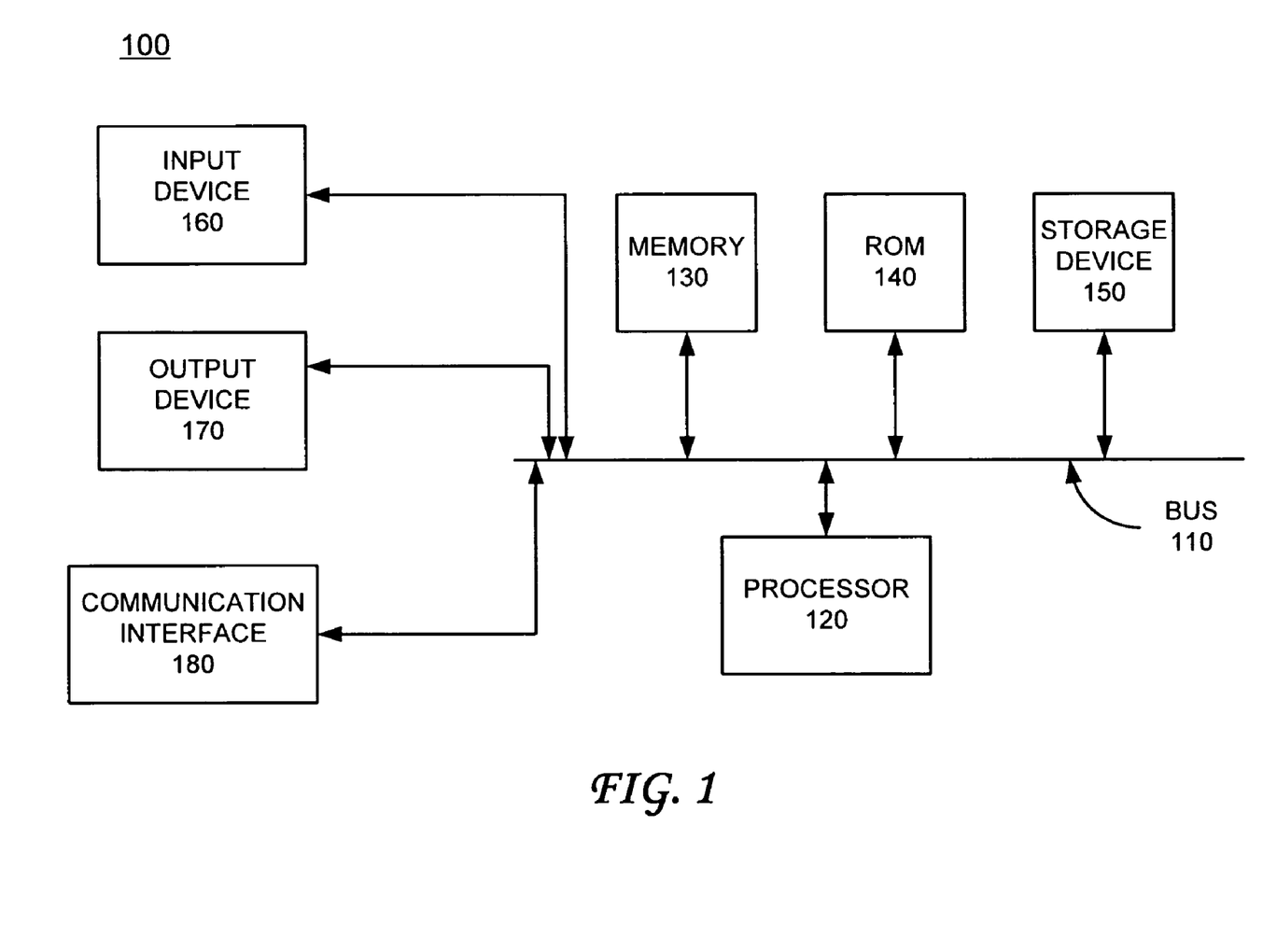
FIG. 1 is a functional block diagram of a processing device which may be used to implement embodiments consistent with the subject matter of this disclosure.

FIG. 1 is a functional block diagram of a processing device 100 which may be used to implement embodiments consistent with the subject matter of this disclosure. Processing device 100 may include a bus 110, a processor 120, a memory 130, a read only memory (ROM) 140, a storage device 150 and a communication interface 180.

Bus 110 may be a communication interface that permits communication among components of processing device 100. Processor 120 may include at least one conventional processor or microprocessor that interprets and executes instructions. Memory 130 may be a random access memory (RAM) or another type of dynamic storage device that stores information and instructions for execution by processor 120.

Memory 130 may also store temporary variables or other intermediate information used during execution of instructions by processor 120. ROM 140 may include a conventional ROM device or another type of static storage device that stores static information and instructions for processor 120. Storage device 150 may include any type of tangible media for storing data and/or instructions. Communication interface 180 may include any transceiver-like mechanism that enables processing device 100 to communicate with other devices or networks via a wireless connection, such as, for example, a radio frequency (RF) interface or other interface.

Processing device 100 may perform such functions in response to processor 120 executing sequences of instructions contained in a machine-readable medium, such as, for example, memory 130, or other tangible media. Such instructions may be read into memory 130 from another tangible machine-readable medium, such as storage device 150, or from a separate device via communication interface 180.

Exemplary Processing

Figure 2A:
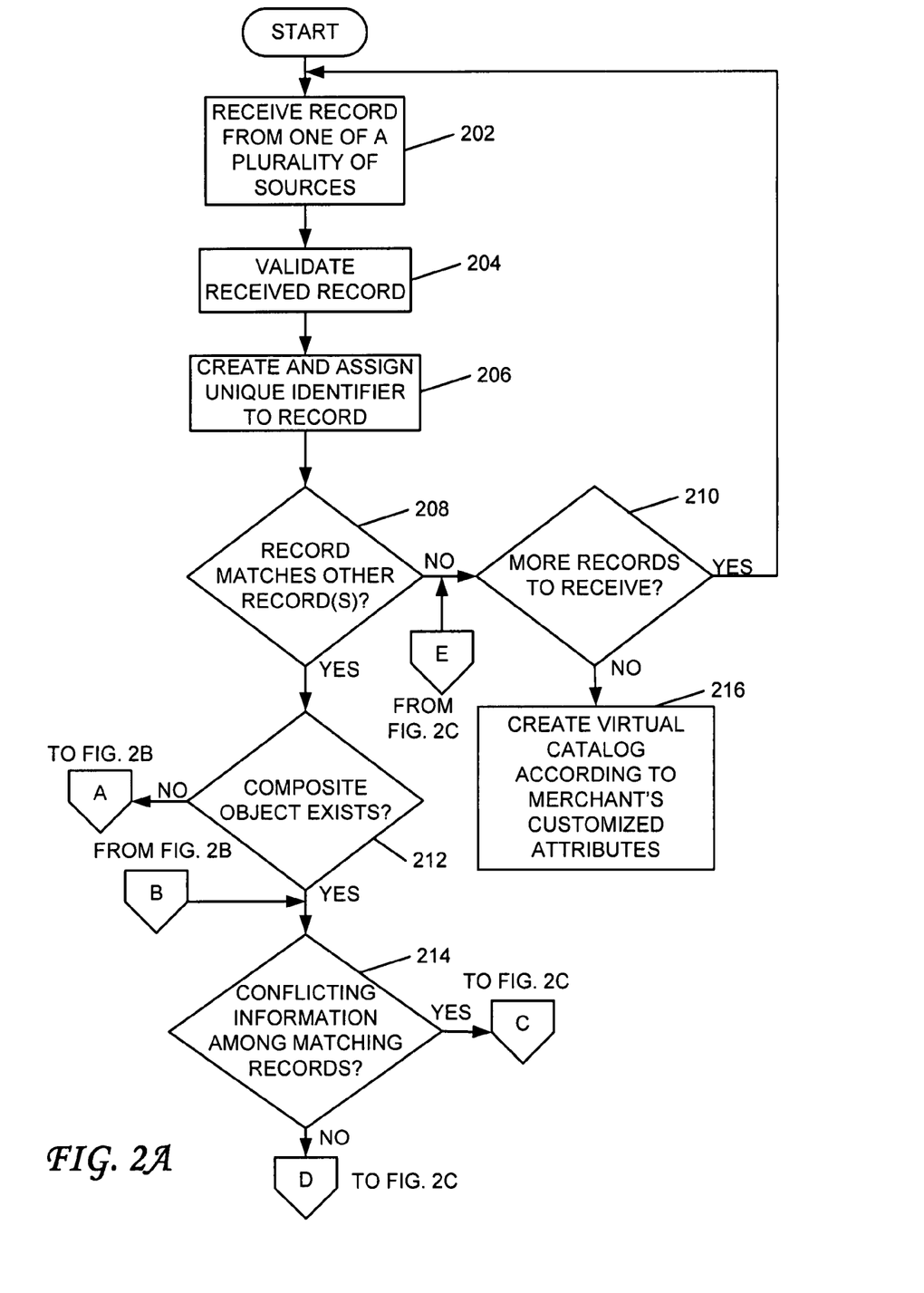
FIGS. 2A-2C are flowcharts which illustrate an exemplary process that may be performed in embodiments consistent with the subject matter of this disclosure.
Figure 2B:
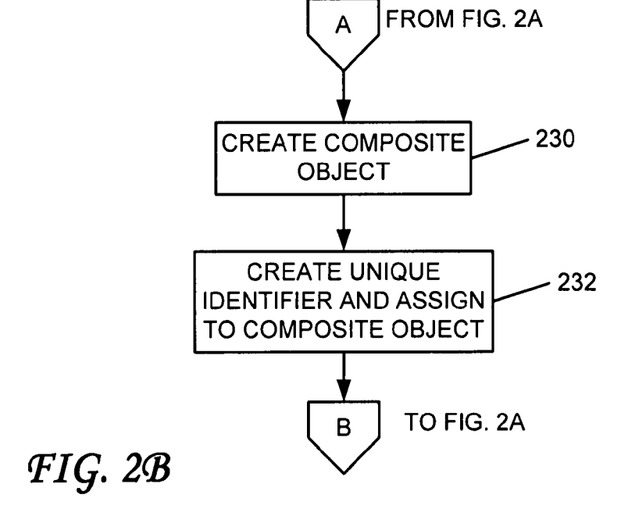
Figure 2C:
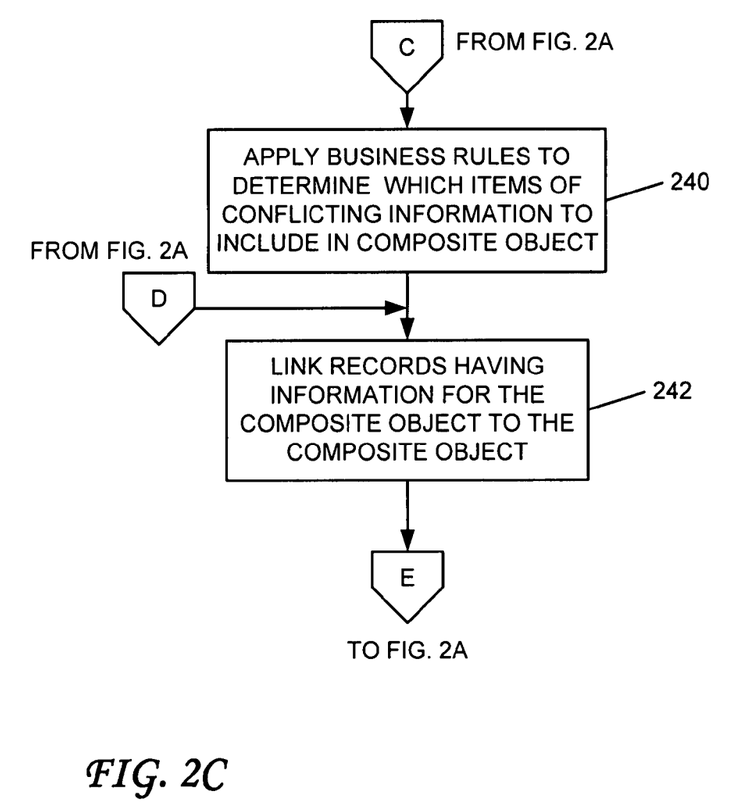

FIGS. 2A-2C are flowcharts which illustrate an exemplary process that may be performed in embodiments consistent with the subject matter of this disclosure. The process may begin with a record being received from one of a number of sources or data feeds by a processing device, such as, for example, processing device 100 (act 202). The record may be received by the processing device via a network or other means. The record may include information pertaining to an item or a product. For example, the record may include a name of an item or a product and may also include one or more attributes of the item or the product.

Next, the processing device may validate the received record (act 204). The validation may include determining whether the format of the received record is correct and whether the information included in the received record is of a proper syntax.

The processing device may then create and assign a unique identifier to the record (acts 206). In one embodiment, the unique identifier may be a globally unique identifier (GUID), which may include 32 hexadecimal digits, such as, for example, 0000002F-0000-0000-C000-000000000046. In other embodiments, the unique identifier may include a different number of digits, letters, or special characters.

Next, the processing device may determine whether the received record matches any one or more previously-received records (act 208). In one embodiment, two or more records may be considered to be matching records if they pertain to the same product or item. In other embodiments, other criteria may be used to determine a match. If the received record does not match one or more previously-received records, then the processing device may determine whether there are more records to be received (act 210). If there are more records to be received, then processing may continue with act 202. Otherwise, one or more virtual catalogs may be created according to one or more merchants customized attributes, as discussed below.

A composite object may pertain to a single product or item and may include information from multiple records. The multiple records may be from one or more sources or data feeds. If, during act 208, the processing device determines that the received record does match one or more of the previously-received records, then the processing device may determine whether a composite object exists with respect to the matching one or more previously-received records (act 212). In one embodiment, each received record that includes information that is also included in a composite object has a link to the composite object. Therefore, in such an embodiment, existence of a composite object may be determined by a matching record having a link to a composite object. In other embodiments, other methods may be used to determine existence of a composite object.

If, during act 212, the processing device determines that the composite object does not exist, then the processing device may create the composite object to include information from the matching records (act 230; FIG. 2B). The processing device may then create a unique identifier, which may be a GUID or other unique identifier, and may assign the unique identifier to the composite object (act 232).

After creating the composite object and assigning the unique identifier to the composite object, or after determining, during act 212, that the composite object exists, the processing device may determine whether conflicting information exists among the matching records (act 214). As an example of conflicting information, a first record may include information about a product, called a widget, with an attribute, called price, having a value of $100. A second record may include information about the widget and may also have an attribute, called price, having a value of $135. The value of price in the first record conflicts with the value of price in the second record.

If the processing device determines that conflicting information exists among the matching records, then rules, such as a set of business rules, may be applied to the records to determine which items among the conflicting information have precedence, or priority (act 240; FIG. 2C). In some embodiments, an item of conflicting information having a lower precedence level may be selected as an item to be included in the composite object. In other embodiments, an item of conflicting information having a higher precedence level may be selected as an item to be included in the composite object.

After applying the rules and including one or more items of the conflicting information in the composite object, as determined by the rules, the records having information included in the composite object may be linked to the composite object (act 242). This act may also be performed after determining, during act 214, that no conflicting information exists among the matching records. In some embodiments, a record may be linked to a composite object by including the unique identifier of the composite object in a field of the record. In other embodiments, a record may be linked to a composite object using numerous other methods.

Next, the processing device may determine whether additional records exist to be processed (act 210; FIG. 2A). If so, the process may again be repeated beginning with act 202. Otherwise, a virtual catalog may be created according to one or more merchants customized attributes (act 216). This will be discussed in more detail below.

EXAMPLES

Figure 3:
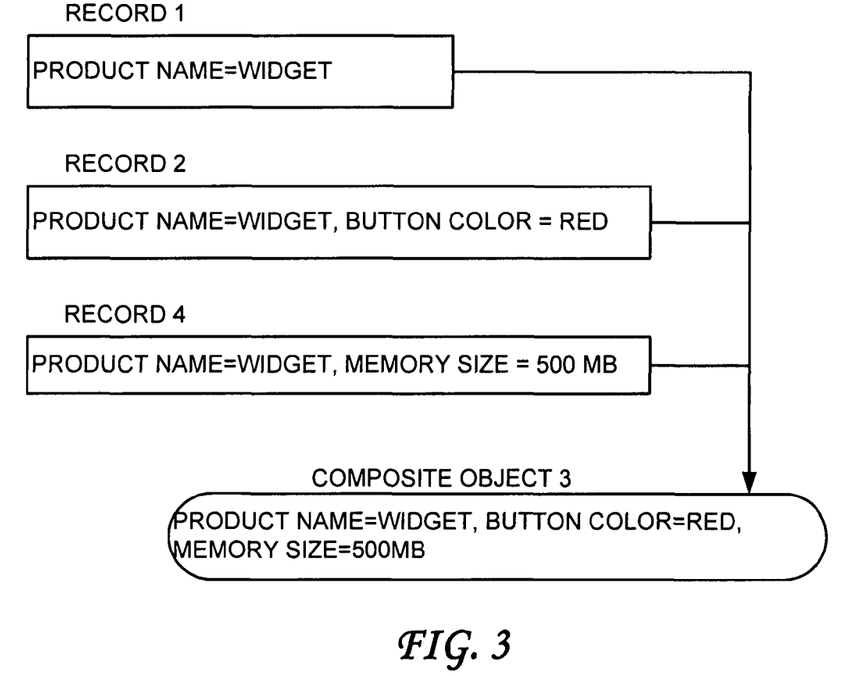
FIG. 3 illustrates an example in which three records pertaining to a product are received and processed.

FIG. 3 illustrates an example in which three records are received. Processing of the records, in this example, will be described with reference to the flowcharts of FIGS. 2A-2C. First, a record, a record 1, may be received from one of a number of sources or data feeds (act 202). In this example, record 1 may include an attribute, product name, having a value of widget. Next, record 1 may be validated (act 204). For example, the format of record 1 may be validated to make sure that the record has a proper format. Assuming that record 1 has the proper format, the processing device may create and assign a unique identifier to record 1 (act 206). For the sake of simplicity, assume that record 1 is assigned a unique identifier of 1. Although in other embodiments, the unique identifier may include a number of numbers, letters, and/or special characters.

Next, the processing device may determine whether record 1 matches other records (act 208). In this example, record 1 is a first record of a group of records. Therefore, at this point, record 1 does not match other records. As a result, the processing device may determine whether there are more records to receive and process (act 210). Because more records exist to process, the processing device may again perform act 202.

The processing device may then receive a second record, record 2 from a second one of a number of sources or data feeds (act 202). In this example, record 2 may include an attribute, product name, having a value of widget, and an attribute of button color having a value of red. The format of record 2 may then be validated (act 204). The processing device may then create and assign a unique identifier to record 2 (act 206). For the sake of this example, assume that record 2 is assigned a unique identifier of 2.

Next, the processing device may determine whether record 2 matches other records (act 208). In this example, because record 1 and record 2 include information pertaining to a product named, widget, the processing device may determine that record 1 and record 2 are matching records. As a result, the processing device may then determine whether a composite object exists including information from the matching records (act 212). At this point, a composite object including information from the matching records does not yet exist. Therefore, the processing device may create the composite object to include information from record 1 and record 2 (act 230; FIG. 2B). For example, the composite object, composite object 3 may include the product name, widget, and an attribute, button color, having an attribute with a value of red. Next, the processing device may create a unique identifier and assign the unique identifier to composite object 3 (act 232). For the sake of this example, the unique identifier is 3.

The processing device may then determine whether there are any conflicting items of information among the matching records (act 214; FIG. 2A). In this example, there is no conflicting information at this point. Therefore, the records having information included in the composite object may be associated, or linked to the composite object (act 242; FIG. 2C). Thus, in this example, record 1 may be linked to composite object 3, and record 2 may be linked to composite object 3. In one embodiment, the unique identifier of composite object 3 may be stored in a field included in record 1 and in a second field included in record 2.

Next, the processing device may determine whether there are more records to receive for processing (act 210; FIG. 2A). In this case, another record does exist and processing proceeds to act 202.

The processing device may then receive record 4 (act 202). Record 4 may include an attribute, product name, having a value of widget, and an attribute, memory size, having a value of 500 mb. A format of record 4 may then be validated (act 204). Assuming that the format of record 4 is successfully validated, the processing device may then create and assign a unique identifier to record 4 (act 206). For the sake of this example, assume that record 4 is assigned a unique identifier of 4.

Next, the processing device may determine whether record 4 matches other records (act 208). In this example, because record 1, record 2 and record 4 have information pertaining to a widget, record 1, record 2, and record 4 are considered to be matching records. The processing device may then determine whether a composite object exists with respect to records 1 and 2 (act 212). In this example, because record 1 and record 2 are linked to a composite object, composite object 3, the processing device determines that a composite object does exist.

Next, the processing device may determine whether conflicting information exists among the matching records (act 214). In this example, none of the records have conflicting information. Therefore, information from records 1, 2, and 4 may be included in composite object 3. The processing device may then link record 4 with composite object 3, which may include product name, button color, and memory size (act 242; FIG. 2C).

Next, the processing device may determine whether there are more records to receive and process (act 210; FIG. 2A). In this example, there are no additional records to receive. Therefore, the processing device may proceed to create one or more virtual catalogs according to one or more merchants' customized attributes, as will be described below.

Figure 4:
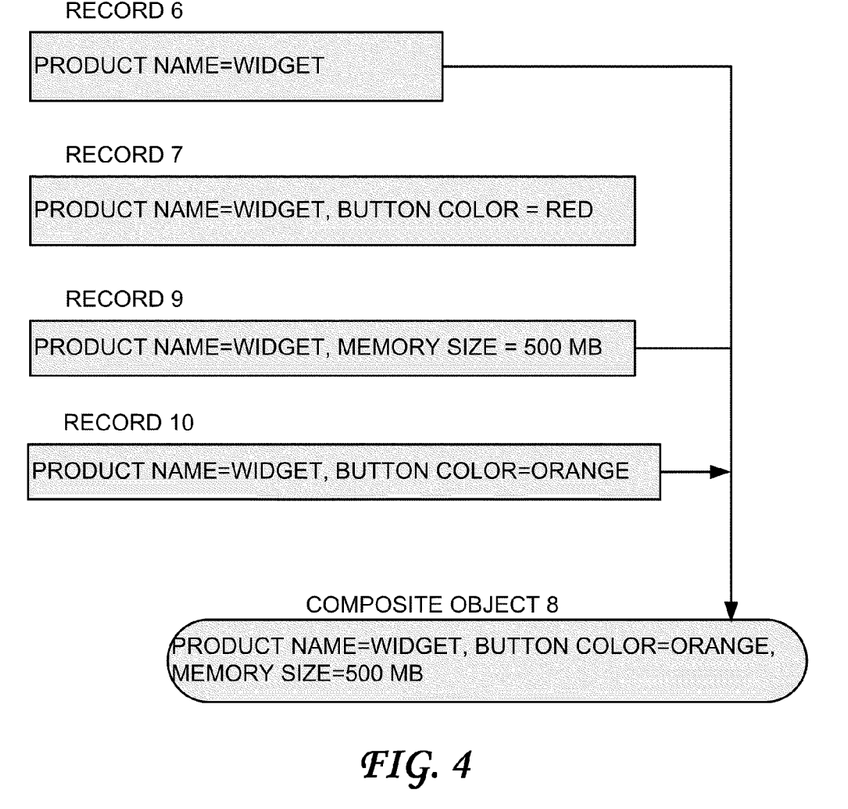
FIG. 4 illustrates an example in which four records pertaining to a product are received and processed.

FIG. 4 illustrates an example in which four records are received, some of which have conflicting information. Processing of the records, in this example, will be described with reference to the flowcharts FIGS. 2A-2C. First, a processing device may receive a record, record 6, from one of a number of sources or data feeds (act 202). Record 6 may include an attribute, product name, having a value of widget. Next, a format of record 6 may be validated (act 204). Assuming that record 6 has the proper format, the processing device may create and assign a unique identifier to record 6 (act 206). For the sake of simplicity, assume that record 6 is assigned a unique identifier of 6.

Next, the processing device may determine whether record 6 matches other records (act 208). In this example, record 6 is a first record of a group of records. Therefore, at this point, record 6 does not match other records. As a result, the processing device may determine whether there are more records to receive and process (act 210). Because more records exist to process, the processing device may again perform act 202.

The processing device may then receive a second record, record 7, from a second one of a number of sources or data feeds (act 202). Record 7 may include an attribute, a product name, having a value of widget, and an attribute, button color, having a value of red. The format of record 7 may then be validated (act 204). The processing device may then create and assign a unique identifier to record 7 (act 206). For the sake of this example, assume that record 7 is assigned a unique identifier of 7.

Next, the processing device may determine whether record 7 matches other records (act 208). In this example, because record 7 and record 6 include information pertaining to a product named, widget, the processing device may determine that record 6 and record 7 are matching records. As a result, the processing device may then determine whether a composite object exists including information from the matching records (act 212). At this point, a composite object including information from the matching records does not yet exist. Therefore, the processing device may create the composite object, composite object 8, to include information from record 6 and record 7 (act 230; FIG. 2B). Thus, at this point, composite object 8 may include an attribute called product name with a value of widget and an attribute called button color with a value of red. Next, the processing device may create a unique identifier and assign the unique identifier to composite object 8. For the sake of this example, the unique identifier assigned to the composite object is 8 (act 232).

The processing device may then determine whether there are any conflicting items of information among the matching records (act 214; FIG. 2A). At this point, there are no conflicting items of information. Therefore, the records having information included in the composite object may be associated, or linked to composite object 8 (act 242; FIG. 2C). Thus, in this example record 6 may be linked to composite object 8, and record 7 may be linked to composite object 8.

Next, the processing device may determine whether there are more records to receive for processing (act 210; the FIG. 2A). In this case, another record does exist and processing proceeds to act 202.

The processing device may then receive record 9 (act 202). Record 9 may include an attribute, product name, having a value of widget, and an attribute, memory size, having a value of 500 MB. A format of record 9 may then be validated (act 204). Assuming that the format of record 9 is valid, the processing device for then create and assign a unique identifier to record 9 (act 206). For the sake of this example, assume that record 9 is assigned a unique identifier of 9.

Next, the processing device may determine whether record 9 matches other records (act 208). In this example, because record 6, record 7, and record 9 have information pertaining to a widget, record 6, record 7, and record 9 are considered to be matching records. The processing device may then determine whether a composite object exists with respect to records 6 and 7 (act 212). In this example, because record 6 and record 7 are linked to a composite object, composite object 8, the processing device determines that a composite object does exist.

Next, the processing device may determine whether conflicting information exists among the matching records (act 214). In this example, records 6, 7 and 9 do not have conflicting information. Therefore, information from records 6, 7 and 9 may be included in composite object 8. At this point, composite object 8 may include an attribute, product name, having a value of widget, an attribute, button color, having a value of orange, and an attribute, memory size, having a value of 500 MB. The processing device may then link record 9 with composite object 8 (act 242; FIG. 2C).

Next, the processing device may determine whether there are more records to receive and process (act 210; FIG. 2A). Because another record exists to be processed, the processing device may receive record 10 from one of a number of sources or data feeds (act 202).

The processing device may then validate a format of received record 10 (act 204). Assuming that the format of record 10 is valid, the processing device then may create and assign a unique identifier to record 10. For the sake of simplicity, assume that the processing device assigns a unique identifier 10 to record 10.

Next, the processing device may determine whether record 10 matches other records (act 208). In this example, because record 6, record 7, record 9 and record 10 have information pertaining to a widget, record 6, record 7, record 9 and record 10 may be considered matching records. The processing device may then determine whether a composite object exists (act 212). In this example, because record 6, record 7 and record 9 are linked to a composite object, composite object 8, the processing device determines that a composite object does exist with respect to a product or item described in the records.

The processing device may then determine whether conflicting information exists among the matching records (act 214). In this example, conflicting information does exist. Attribute, button color, of record 10 has a value of orange and attribute, button color, of record 7 has a value of red. Therefore, the processing device may apply rules, such as, a predefined set of business rules, to determine which items of conflicting information to include in the composite object (act 240; FIG. 2C).

Figure 5:
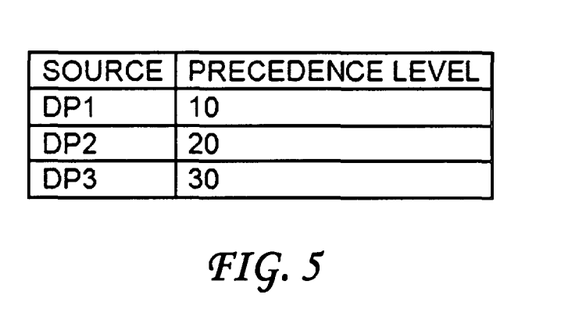
FIGS. 5 and 6 illustrate exemplary rules which may be applied to received records having conflicting information with respect to a product or item.

FIG. 5 illustrates a table of exemplary rules for defining a precedence level or priority based on a source of a record. In this example, records from source DP1 have a precedence level of 10, records from source DP2 have a precedence level of 20, and records from source DP3 have a precedence level of 30. In an embodiment in which a lower value of precedence level is given preference, when the conflicting items of information exist among records originating from DP1, DP2 and DP3, records originating from source DP1 are given preference. When a conflict exists between items of information originating from sources DP2 and DP3, then records originating from DP2 are given preference. In other embodiments, a higher precedence level may be given preference. In such embodiments, items from source DP3 may be given preference, followed by items from source DP2, and then items from source DP1. In some embodiments, no two data sources may have a same precedence level.

Figure 6:
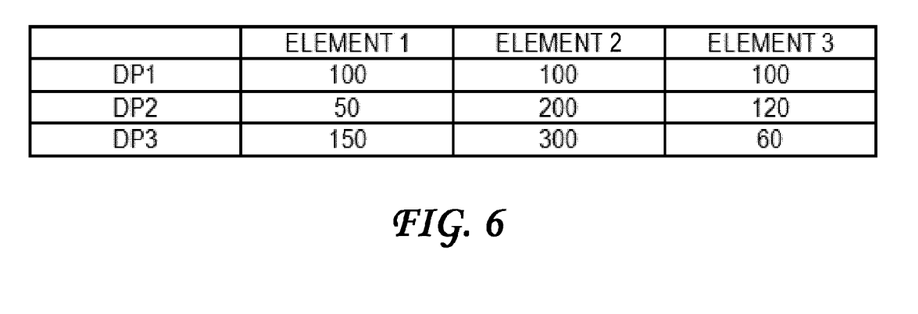

FIG. 6 illustrates another exemplary set of rules which may be used in another embodiment consistent with the subject matter of this disclosure. This set of rules pertains to elements, such as, for example, attributes, which may be included in a record. According to the rules of FIG. 6, element 1 from source DP1 has precedence level 100, element 2 from source DP1 has precedence level 100, element 3 from source DP1 has precedence level 100, element 1 from source DP2 has precedence level 50, element 2 from source DP2 has precedence level 200, element 3 from source DP2 has precedence level 120, element 1 from source DP1 has precedence level 150, element 2 from source DP3 has precedence level 300, and element 3 from source DP3 has precedence level 60. In an embodiment in which preference is given to a lowest precedence level, a product may comprise element 1 from source DP2, element 2 from source DP1, and element 3 from source DP3. In an embodiment in which preference is given to a highest precedence level, a product may comprise element 1 from DP3, element 2 from DP3, and element 3 from DP2. In some embodiments, the elements may refer to particular attributes of a product.

Referring back to act 240 of FIG. 2C, assume that the rules pertain to elements and that the element or attribute, button color, from a source of record 10 has a lower precedence level then the attribute, button color, from a source of record 7, with the rules giving preference to a lower preference level. In such a case, the processing device may select the attribute, button color, with a value of orange from record 10 to be included in composite object 8. The processing device may then link records having information for the composite object to the composite object (act 242). Thus, records 6, and 9 and 10 may be linked to composite object 8 and record 7 may not be linked to composite object 8 because composite object 8 does not include information from record 7. Thus, composite object 8 may include an attribute, product name, having a value of widget, an attribute, button color, having a value of orange, and an attribute, memory size, having a value of 500 MB.

Next, the processing device may determine whether there are more records to receive and process (act 210; FIG. 2A). In this example, there are no additional records to process. The processing device may then create one or more virtual catalogs according to one or more merchants' customized attributes (act 216).

Virtual Catalog

Figure 7:
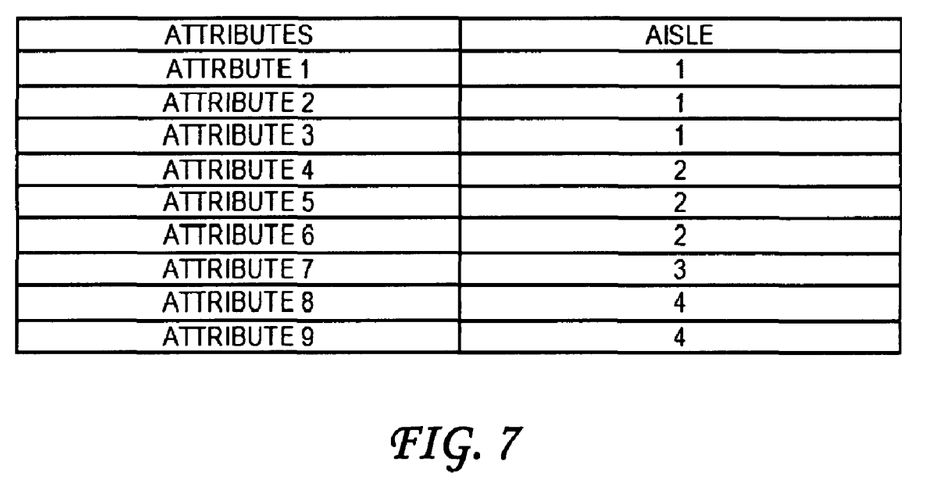
FIG. 7 illustrates exemplary customized attributes for creating a virtual catalog having a customized organization.

A merchant may specify customized attributes for a virtual catalog to be created from the received records and composite objects. FIG. 7 provides an example of customized attributes in one embodiment consistent with the subject matter of this disclosure. According to FIG. 7, products or components having attributes 1, 2, or 3 may be placed in aisle 1 of the virtual catalog, products or components having attributes 4, 5, or 6 may be placed in aisle 2 of the virtual catalog, products or components having attribute 7 may be placed in aisle 3 of the virtual catalog, and products or components having attributes 8 or 9 may be placed in aisle 4 of the virtual catalog. In some embodiments, a merchant may specify that products or components having certain groups of attributes be placed in certain aisles. In other embodiments, a merchant may specify another organization of the virtual catalog based on other criteria. Further, in some embodiments a number of merchants may specify a number of customized attributes for a number of organizations for many virtual catalogs.

CONCLUSION

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they should not be construed as limiting the claims in any way. Other configurations of the described embodiments are part of the scope of this disclosure. Further, implementations consistent with the subject matter of this disclosure may have more or fewer acts than as described, or may implement acts in a different order than as shown. Accordingly, the appended claims and their legal equivalents should only define the invention, rather than any specific examples given.

We claim as our invention:

1. A method for creating a virtual catalog from a plurality of records originating from a plurality of sources, the method comprising:
   receiving a record which describes an aspect of a product from one of the plurality of sources;
   determining whether at least one other previously received record for the product exists;
   creating a composite object from the received record and the at least one other previously received record for the product based, at least in part, on a set of business rules when the determining determines that the at least one other previously received record for the product exists, the set of business rules assigning a precedence level to an attribute based on a combination of a source from which data originated and the attribute; and
   creating a virtual catalog including information from the composite object, wherein
   the method is performed by a processing device.

2. The method of claim 1, wherein the creating of the composite object from the received record and the at least one other previously received record for the product further comprises:
   applying the set of business rules to determine a value for an attribute of the composite object based on an assigned precedence level of the attribute of the received record and an assigned precedence level of the attribute in one of the at least one other previously received record.

3. The method of claim 1, wherein the creating of a virtual catalog further comprises:
   creating the virtual catalog having properties defined by a merchant.

4. The method of claim 1, further comprising:
   validating a format of the received record.

5. The method of claim 1, wherein the creating a virtual catalog further comprises:
   placing each of the products into a respective virtual aisle of the virtual catalog based on a respective attribute of each of the products.

6. The method of claim 1, wherein the creating a virtual catalog further comprises:
   placing each of the products into a respective virtual aisle of the virtual catalog based on a respective group of attributes of each of the products.

7. A processing device for creating a virtual catalog form a plurality of sources, the processing device comprising:
   at least one processor;
   a memory;
   a bus connecting the at least one processor with the memory such that the at least one processor and the memory are arranged to communicate with one another, the memory further including machine-readable instructions which, when executed by the at least one processor, cause the processing device to perform a method comprising:
      receiving a plurality of records from the plurality of sources, each of the plurality of records including information about a respective product; and
      creating a composite object from ones of the plurality of records associated with a same product, the creating a composite object further comprising:
         determining whether conflicting information for the same product is included within the plurality of records, and
         selecting an item of information for the composite object from the conflicting information based upon predefined rules, when the conflicting information for the product is determined to be included within the plurality of records, the predefined rules assigning a precedence level to an item of information of a record based on a combination of a source from which data originated and the item of information; and
      creating the virtual catalog, including at least one composite object, the created virtual catalog being organized according to customized merchant attributes.

8. The processing device of claim 7, wherein:
   the selecting an item of information for the composite object from the conflicting information based upon predefined rules further comprises:
      selecting the item of information for the composite object from one of the records, including a portion of the conflicting information, based upon the precedence level assigned to a corresponding item of information of the one of the records.

9. The processing device of claim 7, wherein the customized merchant attributes include attributes relating to an organization of the virtual catalog.

10. The processing device of claim 7, wherein the method further comprises:
    validating a format of each of the received plurality of records;
    creating a respective unique identifier for each of the validated received plurality of records; and
    assigning the created respective unique identifier to each of the validated received plurality of records.

11. The processing device of claim 7, wherein the creating a composite object from ones of the plurality of records associated with a same product further comprise:

associating with the created composite object each of the ones of the plurality of records having information included in the created composite object.

12. The processing device of claim 7, wherein the method further comprises:
validating a format of each of the received plurality of records;
creating a respective unique identifier for each of the validated received plurality of records; and
assigning the created respective unique identifier to each of the validated received plurality of records, wherein
the creating a composite object from the ones of the plurality of records associated with a same product further comprise:
creating a unique identifier for the composite object and assigning the created unique identifier for the composite object to the composite object; and
associating each of the ones of the plurality of records having information included in the created composite object with the created composite object by storing the unique identifier for the composite object with information for each of the ones of the plurality of records having information included in the created composite object.

13. The processing device of claim 7, wherein the creating a virtual catalog further comprises:
placing each of the products into a respective virtual aisle of the virtual catalog based on a respective attribute of each of the products.

14. The processing device of claim 7, wherein the creating a virtual catalog further comprises:
placing each of the products into a respective virtual aisle of the virtual catalog based on a respective group of attributes of each of the products.

15. A tangible machine-readable medium having instructions recorded thereon for at least one processor of a processing device which, when executed by the at least one processor, cause the processing device to perform a method comprising:
determining whether conflicting information exists within a plurality of records describing at least one aspect of a same product;
creating a composite object based on the plurality of records and a set of predefined rules when the conflicting information is determined to exist within the plurality of records, the predefined rules assigning a precedence level to an item of information of a record based on a combination of a source from which data originated and the item of information; and
creating a virtual catalog, according to customized attributes, from the plurality of records, describing aspects of a plurality of products, and at least one composite object.

16. The tangible machine-readable medium of claim 15, wherein:
the creating a composite object based on the plurality of records and a set of predefined rules further comprises:
selecting an item of information to be included in the composite object, from the conflicting information, based upon a respective precedence level assigned to the item of information according to the set of predefined rules.

17. The tangible machine-readable medium of claim 15, wherein the method further comprises:
validating a format of each of the plurality of records;
creating and assigning a respective unique identifier to each of the validated plurality of records; and
associating each of ones of the plurality of records having information included in the created composite object with the created composite object by storing a unique identifier for the composite object with respective information for each of the ones of the plurality of records.

18. The tangible machine-readable medium of claim 15, wherein the customized attributes pertain to an organization of products within the virtual catalog.

19. The tangible machine-readable medium of claim 15, wherein the creating a virtual catalog further comprises:
placing each of the products into a respective virtual aisle of the virtual catalog based on a respective attribute of each of the products.

20. The tangible machine-readable medium of claim 15, wherein the creating a virtual catalog further comprises:
placing each of the products into a respective virtual aisle of the virtual catalog based on a respective group of attributes of each of the products.

* * * * *